United States Patent [19]
Bengtson

[11] B 3,915,773
[45] Oct. 28, 1975

[54] METHOD OF MAKING ISOCYANATE-BASED FOAM-FILLED PANELS

[75] Inventor: Olle Bengtson, Goteborg, Sweden

[73] Assignee: Imperial Chemical Industries Limited, London, England

[22] Filed: Sept. 1, 1971

[21] Appl. No.: 176,995

[44] Published under the Trial Voluntary Protest Program on January 28, 1975 as document no. B 176,995.

[30] Foreign Application Priority Data
Sept. 7, 1970 Sweden.............................. 12085/70

[52] U.S. Cl. .................. 156/79; 264/46.2; 264/54; 425/4
[51] Int. Cl.² .. B32B 5/18; B29D 27/00; B29G 7/02
[58] Field of Search .............................. 156/77–79, 156/322; 264/47, 45, 50, 51, 54, 45.1, 45.9, 46.2; 161/190, 69; 425/4

[56] References Cited
UNITED STATES PATENTS

| | | | |
|---|---|---|---|
| 2,586,275 | 2/1952 | Toulmin............................ | 161/159 |
| 3,027,040 | 3/1962 | Jodell et al. ......................... | 156/79 |
| 3,062,698 | 11/1962 | Aykanian........................... | 156/322 |
| 3,099,518 | 7/1963 | Wetzler.............................. | 156/79 |
| 3,139,369 | 6/1964 | Sullivan et al. ...................... | 264/45 |
| 3,152,361 | 10/1964 | Edwards ............................ | 264/54 X |
| 3,166,454 | 1/1965 | Voelker.............................. | 156/78 |
| 3,214,793 | 11/1965 | Vidal ................................. | 264/51 X |
| 3,216,849 | 11/1965 | Jacobs................................ | 264/47 |
| 3,233,576 | 2/1966 | Voelker.............................. | 156/79 |
| 3,325,823 | 6/1967 | Boon.................................. | 264/54 X |
| 3,354,503 | 11/1967 | Joseph et al...................... | 264/54 X |
| 3,446,692 | 5/1969 | Turnbull............................ | 161/69 |
| 3,524,825 | 8/1970 | Rill .................................... | 161/190 |
| 3,562,985 | 2/1971 | Nicosia.............................. | 161/190 |
| 3,657,036 | 4/1972 | Mullenhoff et al. ................ | 264/47 |
| 3,812,227 | 5/1974 | Blackwell et al. .................. | 264/54 |
| R24,767 | 1/1960 | Simon et al......................... | 156/79 |

OTHER PUBLICATIONS
"Frothing" – Chem. Engin. Progress, Oct. 1961, Vol. 57, No. 10, pp. 40–41.

*Primary Examiner*—Philip Dier
*Attorney, Agent, or Firm*—Cushman, Darby & Cushman

[57] ABSTRACT

A process for the continuous manufacture of thin isocyanate-based foam-filled panels which comprises supporting and longitudinally conveying two sheets of facing material each in a vertical plane and at a distance apart which is less than the depth of the said sheets, providing a base member adjacent to the lower edges of the sheets thereby defining together with the sheets a continuous cavity, causing the sheets so conveyed to pass a plurality of stationary points of delivery of isocyanate-based foam-forming ingredients, the said points being located within the cavity between the sheets in longitudinally spaced relationship and at successively increasing distances from the base member with respect to the direction of motion of the sheets, and discharging into the cavity from each of the said delivery points a mixture of isocyanate-based foam-forming ingredients containing one or more blowing agents of such volatility that the mixture expands to form a layer of froth occupying at least 10% of the final expanded volume of the foam immediately following discharge of the mixture, the reactivity of the foam-forming ingredients and the rate of passage of the cavity-defining members relative to the delivery points being so adjusted that successive layers of froth delivered from adjacent delivery points just integrate at the interface between said layers so as to form a substantially homogeneous foam throughout the cavity.

12 Claims, 4 Drawing Figures

METHOD OF MAKING ISOCYANATE-BASED FOAM-FILLED PANELS

The present invention relates to a process for the continuous manufacture of foam-filled panels by the production of foam in the space between two facing materials, the depth of the space being greater than the distance between these facing materials, in which the facing materials are conveyed at constant speed and distance apart a number of stationary foam dispensing heads.

Previously known machines for the continuous production of urethane or isocyanurate foam filled panels are based on the principle that the facing materials onto which the foam is applied are arranged horizontally, or very nearly so. Application is effected by means of one or more spray heads moving horizontally to and fro over the width of the facing material, or by means of a larger number of stationary spray heads which give overlapping spray patterns. The difficulty of producing thin, vertical, relatively high foam-filled panels by this lamination principle is that after the liquid ingredients from which the foam is formed have been deposited on the bottom of the vertical cavity, the foam must then rise to the full height of the facing materials. This is likely to produce a foam with a stretched cell structure, particularly if the chemical system is a rapidly reacting one, and this distorted structure will have an adverse effect on the foam properties; in particular the dimensional stability of the foam will be much reduced. This problem cannot be overcome by incremental addition of the liquid foam chemicals, because the deposition of liquid foam-forming ingredients onto a layer of previously dispensed and already rising foam mix also results in a very poor foam structure.

The present invention provides a means of overcoming or minimising this problem.

According to the present invention there is provided a process for the continuous manufacture of thin isocyanate-based foam-filled panels which comprises supporting and longitudinally conveying two sheets of facing material each in a vertical plane and at a distance apart which is less than the depth of the said sheets, providing a base member adjacent to the lower edges of the sheets thereby defining together with the sheets a continuous cavity, causing the sheets so conveyed to pass a plurality of stationary points of delivery of isocyanate-based foam-forming ingredients, the said points being located within the cavity between the sheets in longitudinally spaced relationship and at successively increasing distances from the base member with respect to the direction of motion of the sheets, and discharging into the cavity from each of the said delivery points a mixture of isocyanate-based foam-forming ingredients containing one or more blowing agents of such volatility that the mixture expands to form a layer of froth occupying at least 10% of the final expanded volume of the foam immediately following discharge of the mixture, the reactivity of the foam-forming ingredients and the rate of passage of the cavity-defining members relative to the delivery points being so adjusted that successive layers of froth delivered from adjacent delivery points just integrate at the interface between said layers so as to form a substantially homogeneous foam throughout the cavity.

It will be understood that, in the process so defined, the total amount of foam required to fill the cavity between the sheets of facing material is obtained by incremental addition of successive layers of foam, the layers being discharged at successively higher levels within the cavity as results of the vertical spacing of the respective delivery points, and each layer being allowed a short residence time in the cavity before the next layer is deposited on top of it as a result of the longitudinal spacing of the delivery points.

For a foam-forming mixture of given reactivity, and this depends not only upon the chemical composition and temperature of the mixture but also on the ambient temperature, a suitable rate at which to convey the cavity-defining members past the delivery points may be found by simple trial. Thus, for given reaction mixture a number of panels may be prepared using different conveying speeds or by varying the distance between adjacent delivery points, a sheet of facing material then being removed from each panel to permit examination of the foam structure.

To illustrate the various foam structures which may be obtained, reference is made to the accompanying drawings in which FIG. 1 shows a vertical section through three foams each of which has been produced by delivering a layer of froth from one delivery point onto a layer delivered from a previous delivery point. In foam A, the rate at which the cavity-defining members have been conveyed past successive delivery points has been too low and the lower layer (11) has already developed a hard skin before the upper layer is delivered. Pockets of trapped air (12) are present between the two layers. The overall inhomogeneity of the foam has undesirable effects on the properties of the final panel. In foam B of FIG. 1, two layers of froth have just integrated at their interface to form a homogeneous foam structure, that is to say blending of the two layers has taken place locally at the interface only. Foam B was obtained by the process of the invention, the cavity-defining members having been conveyed past the delivery points at an appropriate speed in relation to the reactivity of the foam-forming mixture. In foam C of FIG. 1, the rate at which the cavity-defining members have been conveyed past successive delivery points has been too high, the upper layer of froth having been deposited onto the lower layer whilst the latter is in a very fluid state. Gross mixing of the two layers has taken place giving an undesirably turbulent structure.

According to one embodiment of the invention, the process is carried out by using a mixture of foam-forming ingredients such that vaporisation of the whole of the blowing agent or agents present occurs immediately upon discharge of the mixture at the delivery points. In this case, the total volume of foam required to fill the cavity is substantially the sum of the volumes of the successive layers of froth. In another embodiment, the process is carried out using a foam-forming mixture such that only a part of the blowing agent or agents present vaporises immediately upon discharge, the vaporisation of the remainder occurring as a result of the heat generated by the polymerisation reaction between the other foam-forming ingredients. In this case, each layer of froth delivered into the cavity expands further, so that the cavity is substantially filled when the polymerisation reaction is complete. Where complete frothing of the foam-forming ingredients is required, the blowing agent or agents incorporated therein will have boiling points lying below the ambient temperature of operation. A suitable blowing agent for this purpose, where the ambient temperature is room temperature, is difluorodichloromethane (commonly known as Refrigerant 12). Where only partial frothing of the ingredients is required, the blowing agents incorporated will normally include a proportion of an agent of low boiling point, such as difluorodichloromethane, and a proportion of an agent of boiling point higher than the ambient temperature, such as monofluorotrichloromethane (commonly known as Refrigerant 11). As already stated, in the case of partial frothing the froth should occupy at least 10% of the final volume of the foam; preferably it occupies between 25% and 50% of the final foam volume.

The isocyanate-based foam-forming ingredients may be any of those which are well known for use in the production of laminated foam panels; they may be of the rapidly reacting type, as for example those which lead to the formation of polyisocyanurate foams, or they may be of the more slowly reacting type, as for example those used for the production of polyurethane foams. These systems have the common property that the ingredients may be dispensed as a froth by vaporisation of all or a part of the blowing agent or agents present immediately following delivery from the dispensing heads, with no tendency for the froth subsequently to collapse.

Reaction mixtures suitable for the production of isocyanate-based foams are well-known and have been fully described in the prior art. Such reaction mixtures contain an organic polyisocyanate, the blowing agent or agents and optionally other conventional additives such as organic polyols, catalysts and surface-active agents. To produce a conventional polyurethane foam an organic polyol is usually present in an amount substantially equivalent to the polyisocyante. To produce a polyisocyanate foam, the organic polyisocyanate is present in an excess amount relative to the polyol and in fact the polyol may be completely omitted from the reaction mixture. Polyisocyanurate formation is effected by including an isocyanate polymerisation catalyst in the reaction mixture.

The sheets of facing materials which are used in the process of the invention may be flexible, for example films, textiles, thin veneer layers and the like, as well as paper, in which case the sheets may be supported during the introduction and cure of the foam by fixed side walls or equivalent means. Flexible facing material may also be used to provide a release surface which can be removed from the finished panel after it has performed the function of preventing the foam sticking to the containing walls. Such flexible facing materials may conveniently be drawn in continuous lengths from suitable supply rolls. Alternatively the facing material may be of a rigid nature, for example wood, metal or asbestos cement board, and it may then be more convenient to supply the material in the form of separate panels which are conveyed in edgewise abutment whilst the foam is formed between them. Such rigid panels may if desired be profiled either in the direction of travel of the panels during the process or transversely to that direction.

To obtain the optimum adhesion between the foam and the facing material, the material may be preheated, for example to a temperature of 60° C, before the foaming process is carried out.

The present invention also includes apparatus suitable for carrying out the process which has been described.

Thus according to the present invention there is further provided apparatus suitable for the continuous manufacture of thin foam-filled panels, comprising means for supporting and longitudinally conveying two sheets of facing material each in a vertical plane and at a distance apart which is less than the depth of the said sheets, means for supporting a base member adjacent to the lower edges of the sheets thereby defining together with the sheets a continuous cavity, and a plurality of stationary dispensing means for foam-forming ingredients which are located within the said cavity in longitudinally spaced relationship and at successively increasing distances from the base member support means with respect to the direction of motion of the conveying means.

The following Example illustrates the process of the invention in the case where the mixture of foam-forming ingredients is such that an initial frothing occurs immediately on delivery from the dispensing head and a further expansion occurs subsequently.

EXAMPLE 1

Two facing sheets 8 mm thick chipboard 122 cm × 244 cm are fixed to a wooden batten to form a unit of U-shaped cross-section, the distance between the sheets being 5 cm. Several such units are taped together end to end to form a continuous section 122 cm high and 5 cm wide. The facing sheets are kept parallel by support rollers and the units are driven by means of a conveyor past four dispensing heads (only three such heads being shown in the drawings) at a speed of 6 m/minute. The dispensing heads are spaced equidistantly within the cavity of the units between the two facing sheets along an 8 m length of the cavity and at increasing heights from the base thereof. Four dispensing heads are fitted, each with a fan-shaped nozzle, and each dispenses a mixture of foam-forming ingredients at 4½ kg/minute. The mixture consists of 100 parts weight of crude diphenylmethanediisocyanate, 22 parts by weight of monofluorotrichloromethane, 12 parts by weight of difluorodichloromethane, and 40 parts by weight of an isocyanurate foam activator. The ratio of the volume of froth initially produced on discharge from the nozzle to the volume of the foam produced on subsequent expansion is about 1:3, and the overall final density of the foam is 32–34 kg/m$^3$. The units are supported by a vertical conveyor for approximately 1 minute, while the foam cures. After the cure of the foam the tape is removed from the units, and the foam is then sawn vertically between the joints of adjacent units.

One of the facing sheets is removed and the foam is found to have a substantially homogeneous structure. The crude diphenylmethane diisocyanate used in the Example has an isocyanate group content of 29.2% and contains approximately 55% by weight of diisocyanatodiphenylmethane isomers, the remainder being largely polymethylene polphenyl polyisocyanates of higher functionality.

The isocyanurate foam activator used is a mixture having the following constitution in parts by weight.

| | |
|---|---|
| Polyester | 20.4 |
| Ethylene glycol | 0.73 |
| Potassium acetate | 0.73 |

-Continued

| | |
|---|---|
| Water | 0.04 |
| Ethylene oxide/propylene oxide block copolymer (molecular weight 2000; 10% ethylene oxide) | 4.0 |
| Siloxane-oxyalkylene copolymer | 1.0 |
| Tris chloropropyl phosphate | 10.0 |

The polyester present in the activator has a hydroxyl number of 360, and acid number less than 3 and is prepared by reacting 151 parts of adipic acid with 167 parts of diethylene glycol and 45 parts of trimethylolpropane.

By way of further illustration, particularly of the apparatus of the invention, a description will now be given of apparatus and procedure for carrying out various embodiments of the invention, with reference to the accompanying drawings in which.

Figure 1:
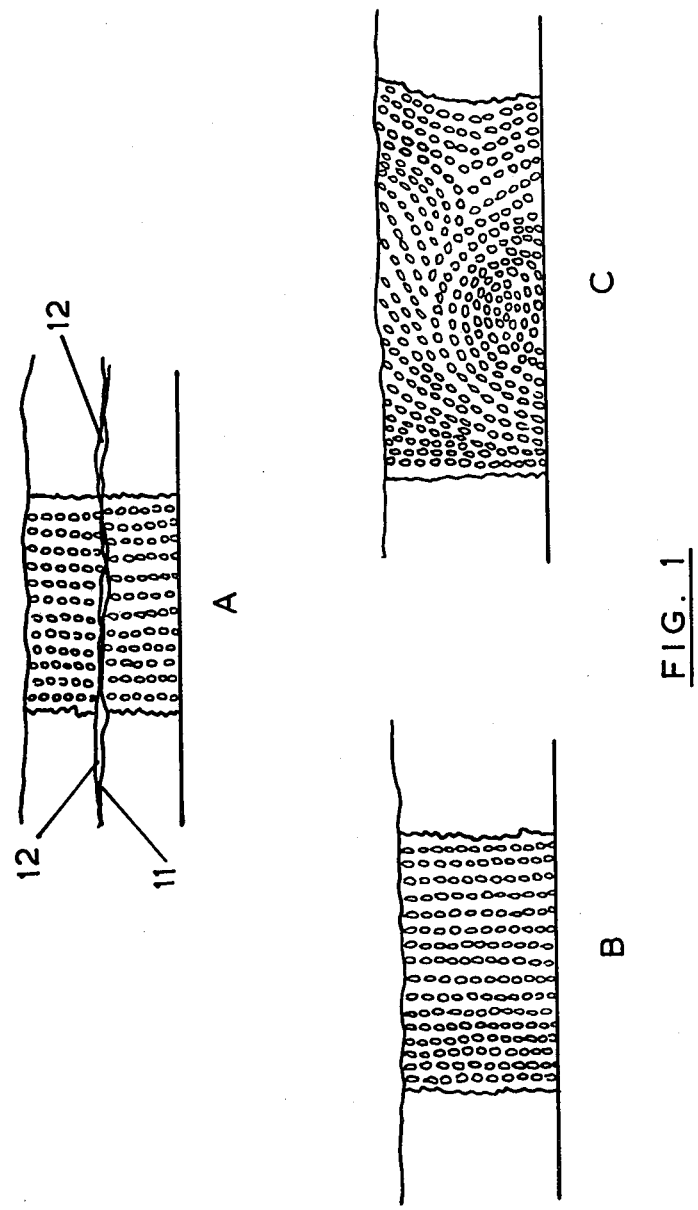
Figure 2:
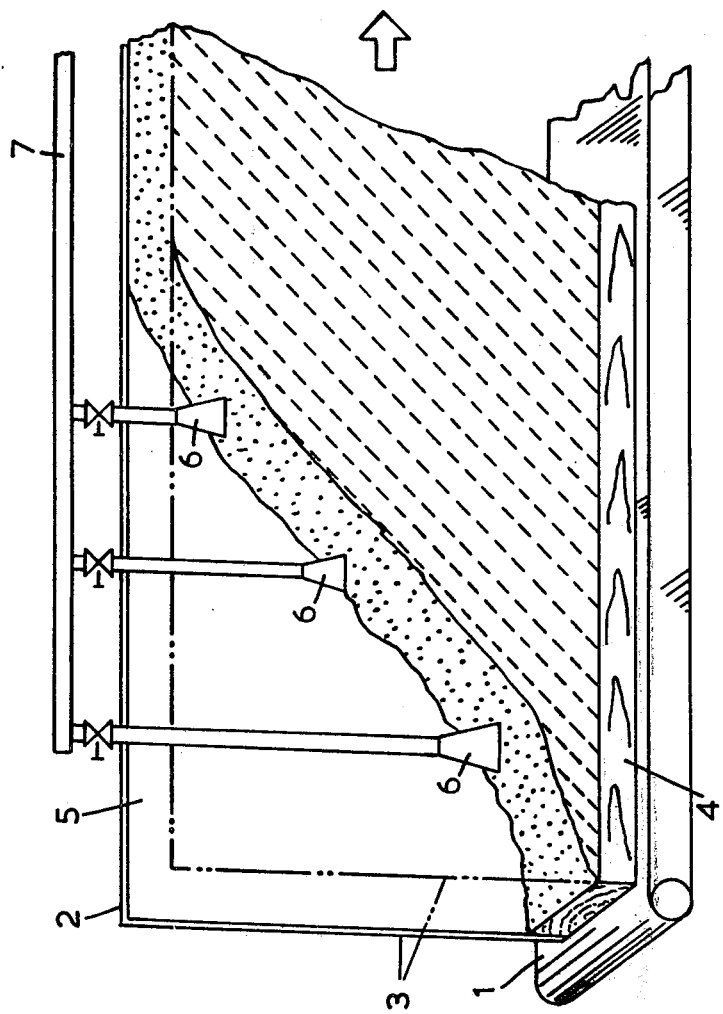
FIG. 2 is a persepective view in part section showing an apparatus for filling a wall unit with foam.

On a conveyor belt (1) is placed a unit (2) consisting of two sheets of facing material (3), forming the vertical side walls of the unit, and a bottom frame (4) which partly holds the side walls apart and partly forms the connection between them. The side walls (3) may be additionally supported during the first part of the conveying motion by, for example, vertical rollers (not shown). In the cavity (5) between the side walls (3) are a number of dispensing heads (6) for a mixture of foam-forming ingredients, placed longitudinally apart from each other and at an increasing distance from the base of the unit (2) in the direction of travel of this unit. The dispensing heads may be attached to a common or to separate feed pipes (7) and the said heads each spread the foam mixture in a fan pattern such that uniform filling of the cavity is obtained and the cavity is completely full when the foam has finished its expansion. (The contour of the upper surface of the foam shown in FIG. 2 is approximately that resulting when a foam mixture is employed which expands completely to its final volume on discharge from the dispensing head).

Figure 3:
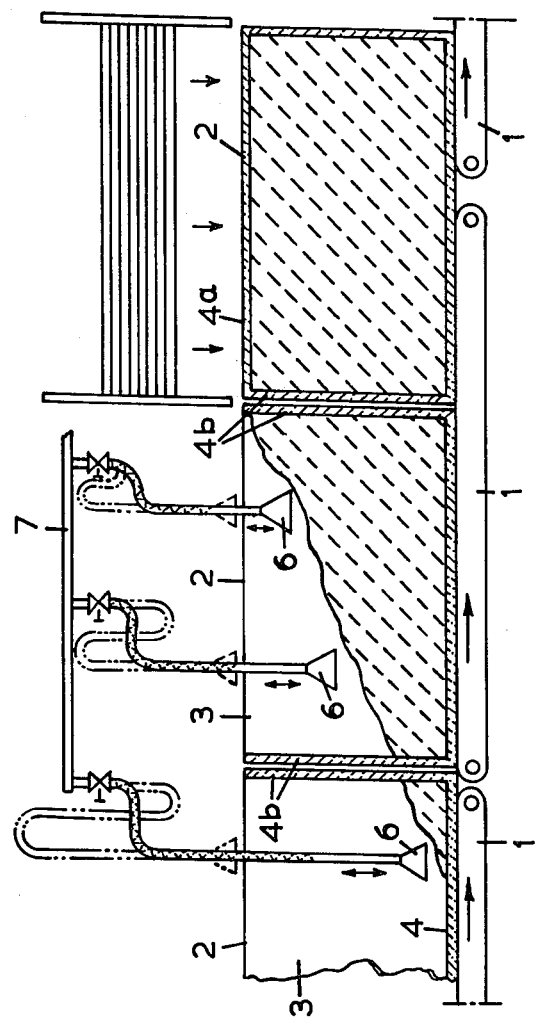
FIG. 3 shows on a reduced scale a side view, partly in cross section, of a modified apparatus.

In the machine shown in FIG. 3 the unit (2) consists of two sheets of facing material separated by a framework extending along three of the sides, whilst the fourth side is open to allow for the introduction of the dispensing heads (6). The vertical parts of the framework (4b) constitute obstacles for dispensing head (6); the latter are, therefore, so arranged that they can be raised and lowered in time with the passage of the vertical framework: at the same time flow through the dispensing heads can be turned off and on. The units are placed end to end in a long row and optionally are fastened together with, for example, tape to produce one continuous length of units. After the foam has been dispensed into the cavity the fourth edge of the cavity may be sealed with an edging strip which is fed from a magazine positioned above the moving units. Optionally there may be sited between the foam dispensing station and this magazine a doctor knife or the like to cut away superfluous foam, so that space is provided for the frame (4a).

The arrangement shown in FIG. 3 is designed for the production of, e.g. units for prefabricated buildings. Where specially wide units have to be made the dispensing heads may be allowed to oscillate transversely to the direction of travel of the units.

Figure 4:
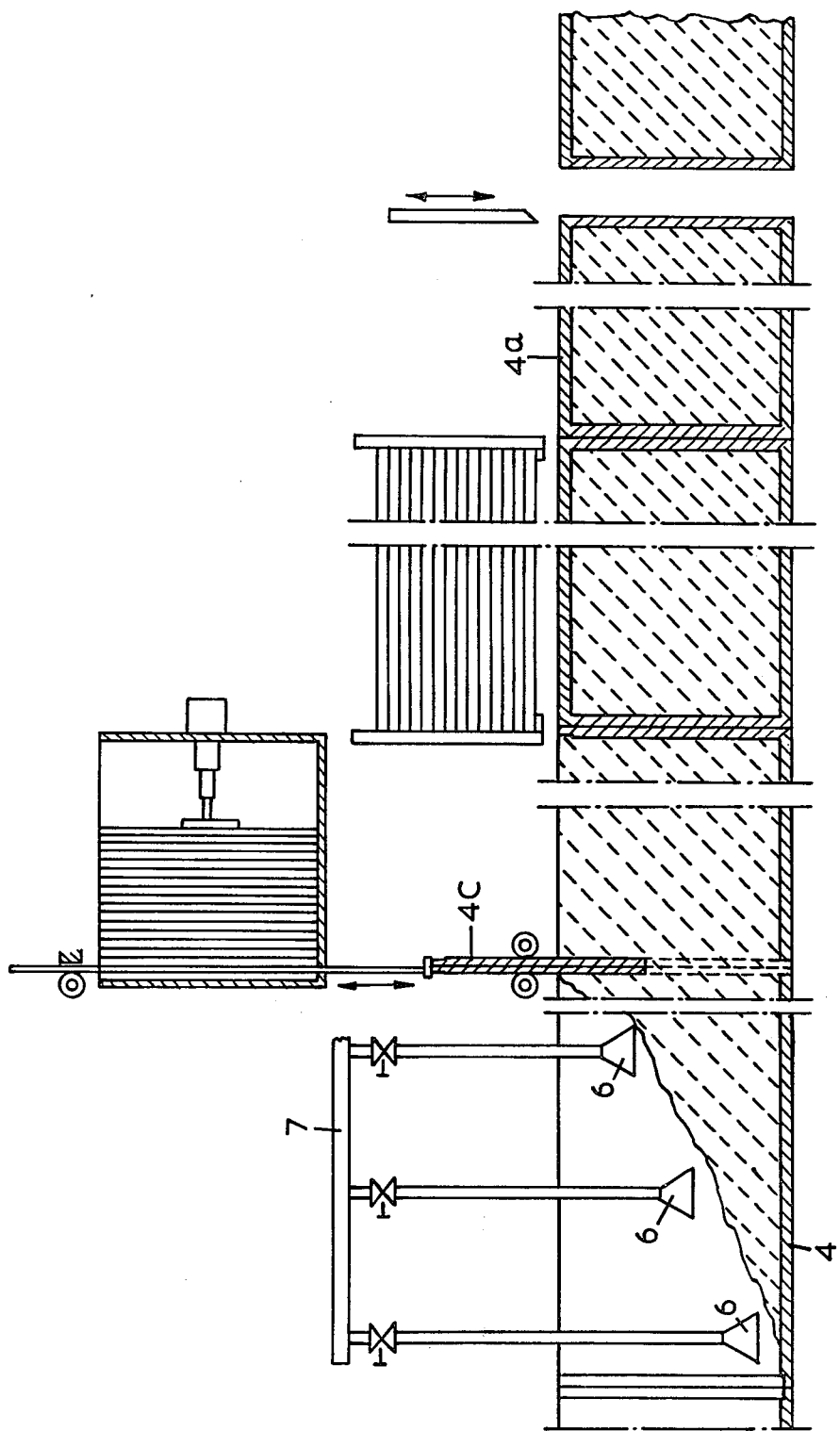
FIG. 4 shows a side view of a further variant of a machine in accordance with the invention.

FIG. 4 shows a modified embodiment of the procedure shown in FIG. 3, in which the fixed vertical part of the framework (4b) is omitted. Instead, the vertical framework consists of U-shaped channels, (4), open at both ends. In this case the dispensing heads may be fixed since the U-shaped channels (4) do not offer a barrier to the dispensing heads. After the foam has been dispensed, vertical edging pieces (4c) are introduced into the U-shaped channels (4). After the foam has cured and the units have been separated from each other these vertical edge pieces (4c) form the edges of the unit.

The invention is further illustrated by the following Examples.

EXAMPLE 2

Two facing sheets of light gauge profiled metal, 122 cm × 244 cm, are mounted, 122 cm side vertical, into a preformed edging strip which holds the two facing sheets in the required vertical relationship. The preformed edging strip also determines the minimum distance between the horizontal/vertical profiles of the metal facing sheets, say 2.5 cm, and joins/seals the bottom edges of the profiled facing sheets to form a 'U' shaped cavity. Several pairs of these vertical facings are similarly prepared, the vertical joint between successive facing sheets being sealed with moulded plastic strips. The facing are kept parallel by support arms and vertical rollers. The units are driven past four dispensing nozzles at a speed of 6 metres per minute. The dispensing nozzles are spaced equidistantly along a 5 metre length, at increasing heights from the base of the channel. Each nozzle dispenses the chemical mixture at 3 Kg per minute. The mixture consists of 100 parts by weight of crude diphenylmethane diisocyanate (as described in Eaxmple 1), 20 parts by weight of monofluorotrichloromethane, 10 parts by weight of difluorodichloromethane, and 37 parts by weight of the isocyanurate foam activator described in Example 1. The overall density of the foam produced from this mixture is approximately 32 Kg per cubic metre. On passing the fourth dispensing nozzle, the open top of the now filled 'U'-shaped cavity is closed by the fitting of a preformed edging strip. The units are supported by two vertical conveyors during the period of chemical dispensing and for a period of approximately 1 minute after the completion of dispensing, while the foam cures. After the cure of the foam the units, continuously produced, are separated one unit from the next, at the vertical moulded plastic sealing strip using a saw or some other suitable cutting device.

When one of the facing sheets is removed the foam is found to have an integrated substantially homogeneous structure.

EXAMPLE 3

Two facing sheets, one of light gauge profiled metal sheet, the other of flat chipboard and both 122 cm × 244 cm are mounted, 122 cm side vertical, into a preformed edging strip, which holds the two facing sheets in the required vertical relationship. The preformed edging strip also determines the minimum distance between the two facing sheets, say 5 cm, and joins/seals the bottom edges of the facing sheets to form a U- shaped cavity. Several pairs of these vertical facings are similarly prepared, the vertical joint between successive facing sheets being sealed with a moulded plastic strip. (The design of the vertical plastic seal is such that ultimately the thickness of the foam will be locally considerably reduced, compared to the nominal foam thickness of 5 cm, making the separation of successive units more easily achieved.) The facings are kept parallel by support arms and vertical rollers. The units are driven past four dispensing nozzles at a speed of 6 metres per minute. The dispensing nozzles are spaced equidistantly along a 5 metre length, at increasing heights from the base of the channel. Each nozzle dispenses the chemical mixture at 3.8 Kg per minute. The mixture consists of 100 parts by weight of crude diphenylmethane diisocyanate (as described in Example 1). 15 parts by weight of monofluorotrichloromethane, 15 parts by weight of difluorodichloromethane and 37 parts by weight of the isocyanurate activator described in Example 1. The overall density of the foam produced from this mixture is approximately 32 Kg./m$^3$. On passing the fourth dispensing nozzle, the open top of the now filled 'U'-shaped cavity is closed by the fitting of a preformed edging strip. The units are supported by two vertical conveyors during the period of chemical dispensing and for a period of approximately one minute after the completion of dispensing, while the foam cures. After the cure of the foam the units, continuously produced, are separated, one unit from the next, at the vertical moulded plastic sealing strip, using a saw or some other suitable cutting device. Alternatively and depending upon the detailed design of the vertical sealing strip, the separation of successive units could be achieved by the sideways bending of the units causing the vertical sealing strip and the locally reduced thickness of foam to break. When one of the facing sheets is removed the foam is found to have an integrated substantially homogeneous structure.

EXAMPLE 4

Two facing sheets of light gauge metal, one sheet profiled and one sheet flat, 122 cm × 244 cm, are mounted, 122 cm side vertical, into a preformed edging strip which holds the two facing sheets in the required vertical relationship. The preformed edging strip also determines the minimum distance between the flat facing sheet and the horizontal/vertical facing sheets, say 23 cm, and joins/seals the bottom edges of the two facing sheets to form a 'U'-shaped cavity. Several pairs of these vertical facing are similarly prepared, the vertical joints between successive facing sheets being sealed with tape or moulded/extruded plastic strips. The facings sheets to form a 'U'-shaped cavity. Several pairs of lers. The units are driven past four dispensing nozzles at a speed of 3 metres per minute. The dispensing nozzles are spaced equidistantly along a 3 metre length, at increasing heights from the base of the channel. Each nozzle dispenses the chemical at 7 Kg. per minute. The mixture consists of crude diphenylmethane diisocyanate (as described in Example 1), 20 parts by weight of difluorodichloromethane, and 37 parts by weight of the isocyanurate foam activator described in Example 1. The overall density of the foam produced from this mixture is approximately 30 Kg./m$^3$. The units are supported by two vertical conveyors during the period of chemical dispensing and for a period of approximately two minutes after the completion of dispensing, while the foam cures. On passing the fourth dispensing nozzle, the open top of the now filled 'U'-shaped cavity is closed by fitting a preformed edging strip. After the cure of the foam, the continuously produced units are separated one unit from the next at the vertical joint, by removing the sealing tape/plastic sealing strip and cutting through the foam with a saw or some other suitable cutting device. When one of the facing sheets is removed the foam is found to have an integrated substantially homogeneous structure.

What we claim is:

1. A process for the continuous manufacture of thin isocyanate-based foam-filled panels which comprises supporting and longitudinally conveying two sheets of facing material each in a vertical plane and at a distance apart which is less than the depth of the said sheets, providing a base member adjacent to the lower edges of the sheets thereby defining together with the sheets a continuous cavity, passing the sheets so conveyed past a plurality of stationary points of delivery of isocyanate-based foam-forming ingredients, the said points being located within the cavity between the sheets in longitudinally spaced relationship and at successively increasing distances from the base member with respect to the direction of motion of the sheets, and discharging into the cavity from each of the said delivery points a mixture of isocyanate-based foam-forming ingredients containing at least one blowing agent to form a layer of froth occupying at least 10% of the final expanded volume of the foam immediately following discharge of the mixture, and adjusting the reactivity of the foam-forming ingredients and the rate of passage of the cavity-defining members relative to the delivery points so that successive layers of froth delivered from adjacent delivery points just integrate at the interface between said layer so as to form a substantially homogeneous foam throughout the cavity.

2. A process as claimed in claim 1 wherein difluorodichloromethane is used as a blowing agent.

3. A process as claimed in claim 1 the mixture of foam-forming ingredients expands immediately following discharge to form a layer occupying between 25% and 50% of the final volume of the foam.

4. A process as claimed in claim 1 wherein said mixture is discharged at delivery points which oscillate transversely to the direction of motion of the facing materials.

5. A process as claimed in claim 1 including the step of inserting an edging strip into the cavity after the delivery of foam-forming ingredients has been completed.

6. A process as claimed in claim 5 including the step of forming units of the facing materials and at least one edging strip and conveying a plurality of such units end to end past the delivery points.

7. A process as claimed in claim 1 wherein the facing materials are rigid panels and the process includes the step of profiling said panels, the foam curing and simultaneously adhering to the said panels.

8. A process as claimed in claim 1 wherein the facing materials consists of flexible sheets to which the foam adheres.

9. A process as claimed in claim 1 which includes the step of treating the facing materials with mould release agents and the facing materials are removed from the foam after the final cure.

10. A process as claimed in claim 1 which includes the step of dispensing the foam-forming mixture in fan-shaped form.

11. A process as claimed in claim 1 which includes the step of preheating the components of the mixture.

12. A process as claimed in claim 1 which includes the step of preheating the facing materials.

* * * * *